Patented Apr. 21, 1953

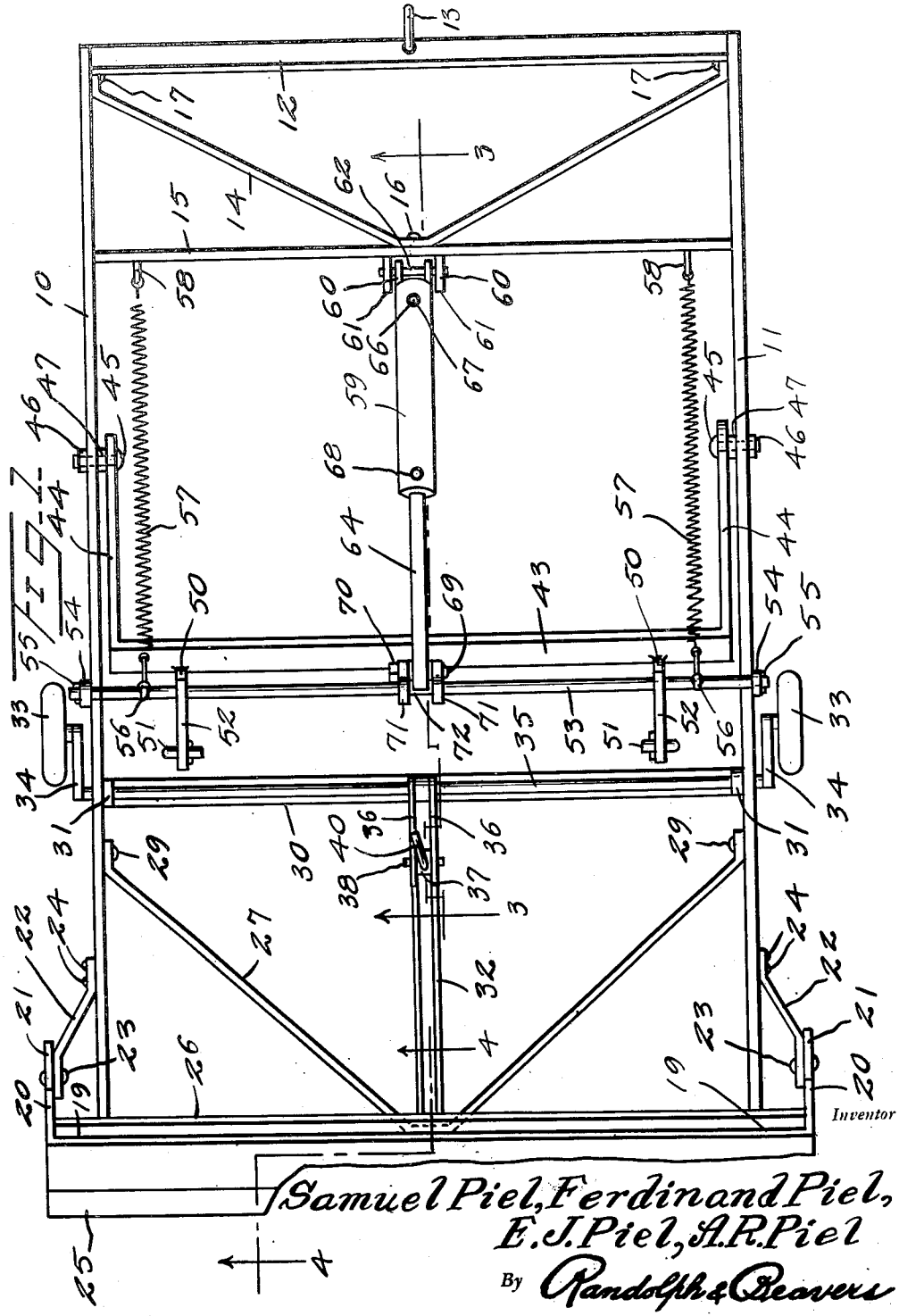

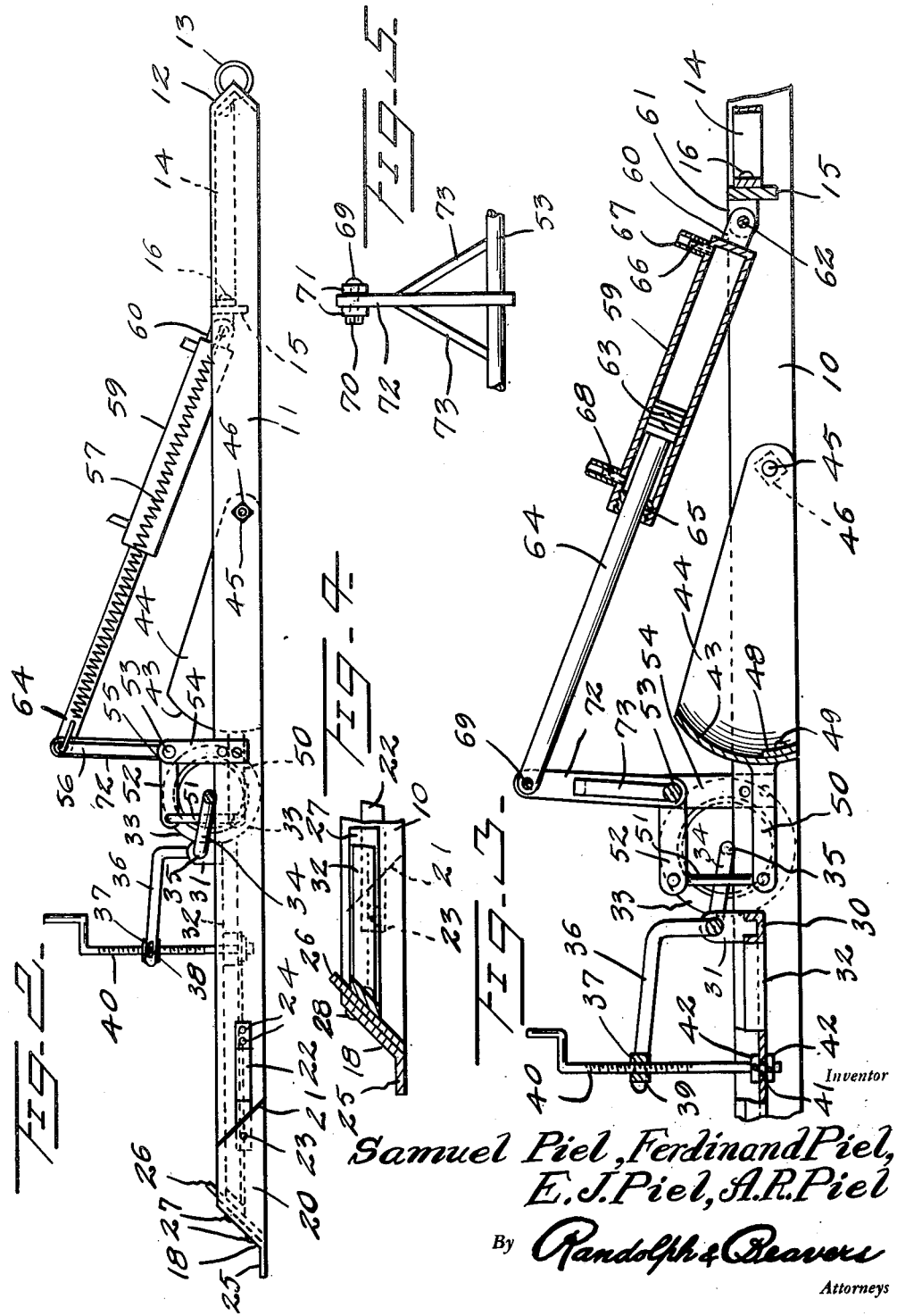

2,635,367

UNITED STATES PATENT OFFICE 2,635,367

HYDRAULICALLY OPERATED LAND LEVELER

Samuel Piel, Ferdinand Piel, Edward J. Piel, and Arnold R. Piel, Worland, Wyo.

Application August 26, 1946, Serial No. 693,016

1 Claim. (Cl. 37—150)

This invention relates generally to scraping levelers of the type adapted to be drawn by a tractor or the like, and provided with operating means conveniently positioned with relation to an operator located on the tractor.

More specifically, the present invention is directed to improvements in levelers of the aforedescribed type wherein hydraulic means controllable at the operator's station is employed to control certain movements of the leveler, thereby to facilitate ease of handling the leveler in dumping the load at the exact spot, or in removing a hump in the path of travel, during movement of the leveler along the ground.

Other features and advantages of the present invention are those relating to the novel construction, combination and arrangement of parts wherein the several objects of the invention are attained, these including, among others, the provision of a leveler whose scraping blade is adapted to be actuated by hydraulic means and which, in addition thereto, possesses all of the desired qualities of ruggedness, durability, and ease of handling.

The foregoing and additional objects of the invention will become more clearly apparent from the following detailed description of the preferred embodiment of the invention, reference being had to the accompanying drawings wherein:

Figure 1 is a plan view of the leveler;

Figure 2 is a side elevation;

Figure 3 is a sectional view taken along the line 3—3 of Figure 1;

Figure 4 is a sectional view taken along the line 4—4 of Figure 1, and

Figure 5 is a detail view of the hydraulically actuated crank arm and shaft.

Referring now to the drawings wherein like reference characters are employed throughout the several views to designate like parts, 10 and 11 designate the side ground engaging runners of the leveler frame, which runners are pointed at their leading ends and joined thereat by a V-shaped cross piece 12 to which is attached or secured a ring 13 or other suitable member to which the towing means from the tractor may be secured.

The leading portion of the leveler frame preferably is braced as by a V-shaped member 14 which extends from the corners to a cross piece 15 to which it is secured as by a rivet 16, the ends of member 14 being similarly secured to the side runners 10 and 11 as by rivets 17.

The trailing ends of runners 10 and 11 extend downwardly and rearwardly and are interconnected by a cross or tail piece 18 which projects beyond the runners as at 19 to cover the tracks formed in the ground by the tractor. Supplementary runners 20 extend forwardly of the ends of tail piece 18 and these preferably taper downwardly at their leading edges as at 21. Runners 20 also preferably are braced from runners 10 and 11 by brackets 22 interposed therebetween and connected thereto as by rivets 23 and 24.

Tail piece 18 includes a horizontal portion 25 which serves to smooth out the ground lying within the path of travel of the leveler, and also preferably includes a strengthening cross piece 26 to which it may be secured as by rivets 27 and which preferably extends above the tail piece, as shown. It will be understood that the tail piece assembly may be formed as an integral unit or in any desired manner.

The rear portion of the leveler frame also is braced by a V-shaped member 27 which is secured as by a rivet 28 to the tail piece assembly and at the ends thereof to runners 10 and 11 as by rivets 29. The rear portion of the leveler frame is additionally strengthened by a cross piece 30 having a U-shaped cross section and upright end portions 31 which are secured to runners 10 and 11. A longitudinal member 32, also U-shaped in cross section, is interposed between member 27 and cross piece 30 and is secured thereto in any convenient manner.

Cross piece 30 and longitudinal member 32 additionally serve as a framework for mounting the ground engaging wheels 33 and the apparatus for adjusting the wheels into a position for supporting the leveler frame whereby it may freely be wheeled along the ground when not used in its usual manner, as in transporting it from place to place.

To this end, wheels 33 are journaled on crank arms 34 which may be formed integrally with a shaft 35 which is journaled in suitable openings formed therefor in uprights 31 of cross piece 30. An angularly formed arm comprising members 36 secured to shaft 35 as by welding thereto in spaced relation thereon, carries a bushing 37 between members 36, the bushing being pivotally secured thereto as by pins 38 extending therebetween.

Bushing 37 has a threaded opening 39 for engagement with the threaded portion of a crank 40 which extends through a suitable opening 41 therefor in member 32. Axial movement of the crank with respect to member 32 is prevented by means of the collars 42 secured to the crank on opposite sides of member 32. Thus as crank 40 is turned, bushing 37 is moved toward and away from collars 42, thereby to rock shaft 35 and raise or lower the wheels depending on the direction of rotation of crank 40.

An arcuately formed scraper blade 43 is extended between runners 10 and 11 and is arranged to be moved substantially vertically with respect thereto by means of the side arms 44 which may be formed integrally with the blade and pivotally secured to the runners as by bolts 45 and nuts 46 therefor, spacer washers 47 preferably being interposed between the runners and blade arms to prevent binding therebetween. The blade 43 preferably carries a hardened ground engaging knife 48 which preferably is removably secured to the blade by rivets 49 whereby the knife may be removed and replaced when worn.

Extending rearwardly of blade 43 is a pair of actuating arms 50 therefor, these being secured thereto as by welding, or formed integrally therewith. Arms 50 are connected as by links 51 with a pair of arms 52 welded to a rocker shaft 53 which is journaled in a pair of upright brackets 54 secured to runners 10 and 11, the shaft being held in position in the brackets as by cotter keys 55.

Shaft 53 also has secured thereto, as by welding, a pair of arms 56 to which are secured a pair of coil springs 57, the opposite ends of which are secured under tension to lugs 58 carried by cross piece 15 whereby shaft 53 is yieldably rocked in a direction to cause blade 43 to be moved upwardly within the leveler frame.

Downward movement of the scraper blade within the frame is controlled hydraulically by means of a cylinder 59 which carries at its closed end a pair of ears 60 which are pivotally secured to a pair of spaced lugs 61 carried by cross piece 15, a suitable pivot pin 62 being employed for this purpose.

A piston 63 is mounted for slidable movement within the cylinder and includes a rod 64 which passes through a suitable sealing and packing member 65 threadedly received in the open end of the cylinder. The cylinder includes an oil inlet port 66 in communication, as by a hose 67, with the usual control valve and pressure pump on the tractor whereby oil may be admitted into cylinder 59 to force the piston 63 toward the opposite end of the cylinder. A bleeder port 68 preferably is provided to remove any oil which passes between the piston and cylinder.

The piston rod 64 is pivotally secured as by a bolt 69 and nut 70 therefor between a pair of ears 71 which are secured, as by welding to an arm 72 in turn welded to rocker shaft 53 and preferably braced thereto as by members 73. Thus, as rod 64 is actuated by the pressure of the oil in cylinder 59, shaft 53 is rocked against the restoring force of springs 57 to force blade 43 to engage the ground. However, when the pressure within the cylinder is released through proper manipulation of the oil control valve at the tractor, rocking movement of shaft 53 under power of springs 57 drives the oil from cylinder 59 concurrently with the lifting of the scraper blade.

From the foregoing, the operation of the leveler in use should now be clearly apparent, and whereas a specific embodiment of the leveler has been disclosed, it will be understood by those skilled in the art to which the present invention apertains, that different embodiments may be devised without departing from the spirit and scope of the invention as defined by the appended claim.

What we claim as our invention and desire to secure by Letter Patent of the United States is:

An apparatus of the character described comprising a horizontally disposed ground-engaging frame including a pair of longitudinally extending spaced runners, transversely extending brace members, a V-shaped cross piece interconnecting the forward ends of said runners, said cross piece presenting its apex portion rearwardly, a transversely disposed scraper blade provided with forwardly disposed arms, pivotal connections between the free end portions of the arms and side portions of the frame, said blade being provided with rearwardly extending actuating arms, risers on said runners, a shaft journaled through the upper portions of the risers, arms projecting from the shaft, links between the last mentioned arms and the actuating arms of the blade, said shaft being provided with a pair of closely spaced upstanding arms, a cross member between the forward end portions of the sides of the frame, a hydraulic unit interposed between the closely spaced upstanding arms on the shaft and said cross member, and a pair of tension springs, said shaft being provided with upstanding arms to which the rear ends of the springs are attached, the forward ends of the springs being attached to said cross member.

SAMUEL PIEL.
FERDINAND PIEL.
EDWARD J. PIEL.
ARNOLD R. PIEL.

References Cited in the file of this patent
UNITED STATES PATENTS

| Number | Name | Date |
|---|---|---|
| 1,388,809 | Edginton | Aug. 23, 1921 |
| 1,672,140 | Tharp | June 5, 1928 |
| 1,919,260 | Schermerhorn | July 25, 1933 |
| 2,128,889 | Allen | Sept. 6, 1938 |
| 2,195,015 | Schwart | Mar. 26, 1940 |
| 2,257,596 | Davenport | Sept. 30, 1941 |
| 2,283,744 | Lethlean | May 19, 1942 |